(12) United States Patent
Zhu et al.

(10) Patent No.: US 12,276,642 B1
(45) Date of Patent: Apr. 15, 2025

(54) STRESS BLANK ANGLE ELIMINATING DEVICE AND METHOD FOR DYNAMIC TRUE TRIAXIAL ELECTROMAGNETIC HOPKINSON BAR

(71) Applicant: Shenzhen University, Shenzhen (CN)

(72) Inventors: Jianbo Zhu, Shenzhen (CN); Weiyue Bao, Shenzhen (CN); Chengcheng Xie, Shenzhen (CN); Tao Zhou, Shenzhen (CN); Shiwei Zhang, Shenzhen (CN); Zhuo Cen, Shenzhen (CN); Yao Wang, Shenzhen (CN); Junyan Li, Shenzhen (CN)

(73) Assignee: Shenzhen University, Shenzhen (CN)

( * ) Notice: Subject to any disclaimer, the term of this patent is extended or adjusted under 35 U.S.C. 154(b) by 0 days.

(21) Appl. No.: 19/020,909

(22) Filed: Jan. 14, 2025

(30) Foreign Application Priority Data

Mar. 22, 2024 (CN) .......................... 202410329827.0

(51) Int. Cl.
*G01N 3/36* (2006.01)
*G01N 3/307* (2006.01)

(52) U.S. Cl.
CPC ............... *G01N 3/36* (2013.01); *G01N 3/307* (2013.01); *G01N 2203/0048* (2013.01); *G01N 2203/0098* (2013.01); *G01N 2203/0256* (2013.01)

(58) Field of Classification Search
CPC .. G01N 3/36; G01N 3/307; G01N 2203/0048; G01N 2203/0256; G01N 2203/0098
See application file for complete search history.

(56) References Cited

U.S. PATENT DOCUMENTS

| 5,048,346 | A | 9/1991 | Yano |
| 2021/0318216 | A1 | 10/2021 | Zhu |
| 2021/0325287 | A1* | 10/2021 | Xie .......................... G01N 3/08 |

FOREIGN PATENT DOCUMENTS

| CN | 103487334 B | 1/2014 |
| CN | 104596841 A | 5/2015 |
| CN | 106442109 A | 2/2017 |
| CN | 108007787 B | 5/2018 |
| CN | 109406313 B | 3/2019 |

* cited by examiner

*Primary Examiner* — Jonathan M Dunlap
(74) *Attorney, Agent, or Firm* — Birchwood IP

(57) ABSTRACT

Provided is a stress blank angle eliminating device and method for a dynamic true triaxial electromagnetic Hopkinson bar. Objectives of eliminating influence of a stress blank angle in a sample in a test and preventing permanent deformation caused by mutual collision between the Hopkinson bars are achieved. The adjustable test device for eliminating the stress blank angle eliminates influence of the stress blank angle generated by the sample in a triaxial six-direction dynamic impact test process, and is convenient for obtaining real dynamic failure parameters of the sample.

8 Claims, 20 Drawing Sheets

STRESS BLANK ANGLE ELIMINATING DEVICE AND METHOD FOR DYNAMIC TRUE TRIAXIAL ELECTROMAGNETIC HOPKINSON BAR

CROSS-REFERENCE TO RELATED APPLICATIONS

This application claims priority to Chinese Patent Application No. 202410329827.0, filed on Mar. 22, 2024, which is hereby incorporated by reference in its entirety.

TECHNICAL FIELD

The present invention relates to the field of high-end equipment manufacturing, and more particularly, to a stress blank angle eliminating device and method for a dynamic true triaxial electromagnetic Hopkinson bar.

BACKGROUND

When rock engineering is constructed and operated in deep stress environment, it is usually affected by complex high strain rate engineering disturbances such as earthquake, blasting excavation and mechanical vibration. Traditional split Hopkinson bar system can only study dynamic failure behaviors of engineering materials such as rocks and concrete under uniaxial dynamic impact load. The invention of the patent number US20210318216A1 provides a dynamic true triaxial electromagnetic Hopkinson bar system and a testing method, which can realize the testing of dynamic failure characteristics of engineering materials under triaxial six-direction synchronous impact load (that is, simulating complex engineering disturbances). Different from the traditional split Hopkinson bar system, the traditional split Hopkinson bar system only has uniaxial dynamic load and no lateral dynamic load, so it is not necessary to consider permanent deformation caused by the mutual collision between Hopkinson bars. When the dynamic true triaxial electromagnetic Hopkinson bar system carries out a dynamic test, a sample is suffered from the triaxial dynamic load. Usually, a gasket made of the same material as the Hopkinson bar (a cross-sectional area is similar to that of the Hopkinson bar, but smaller than the sample) is used to reduce displacement caused by the inertia of the Hopkinson bar, so as to avoid the permanent deformation caused by the mutual collision between the Hopkinson bars. When a size of the gasket is smaller than that of the sample, there will be a stress blank angle (no direct force around) inside the sample under the dynamic load. As shown in FIG. 1B, the shaded area is a stress blank angle area, which significantly affects accuracy of dynamic failure characteristic parameters of the sample.

SUMMARY

In order to solve the problems in the prior art, the present invention provides a stress blank angle eliminating device for a dynamic true triaxial electromagnetic Hopkinson bar, comprising six gaskets, which are respectively a first gasket, a second gasket, a third gasket, a fourth gasket, a fifth gasket and a sixth gasket; and further comprises a guide rail sealing cover, wherein a spring is arranged in the guide rail sealing cover;

a right side of the first gasket at a bottom portion is provided with a projection structure, a bottom side of the second gasket on a right side is provided with a groove, the projection structure on the right side of the first gasket at the bottom portion is matched with the groove on the bottom side of the second gasket on the right side, and the first gasket is tightly embedded with the second gasket;

the third gasket on a rear side is provided with a projection structure, a rear side of the first gasket at the bottom portion is provided with an antifriction guide rail, and the projection structure slides in the antifriction guide rail;

a bottom side of the fourth gasket on a front side is provided with a projection structure, a front side of the first gasket at the bottom portion is provided with an antifriction guide rail, and the projection structure on the bottom side of the fourth gasket on the front side is embedded in the antifriction guide rail on the front side of the first gasket at the bottom portion; and the guide rail sealing cover matched with the antifriction guide rail on the front side of the first gasket is further comprised, wherein a central axis of the spring of the guide rail sealing cover is arranged along a Y direction;

the fifth gasket at a top portion is provided with a front-side projection structure and a right side projection structure, the fourth gasket on the front side is provided with a top-side antifriction guide rail, and the second gasket on the right side is provided with a top-side antifriction guide rail; and the fourth gasket on the front side is further provided with a guide rail sealing cover matched with the top-side antifriction guide rail of the fourth gasket, and the second gasket on the right side is further provided with a guide rail sealing cover matched with the top-side antifriction guide rail of the second gasket;

a length of the first gasket and a length of the third gasket in an X direction are both smaller than a length of a test sample in the X direction; and left and right sides of the sixth gasket are respectively provided with a thin filling block and a long filling block which are capable of being compressed and deformed.

As a further improvement of the present invention, a size difference between the guide rail sealing cover and the antifriction guide rail is 0.05 mm.

As a further improvement of the present invention, a size of the test sample is L mm+1 mm, the length of the first gasket and the length of the third gasket in the X direction are both L mm, and L is a value set according to test needs.

As a further improvement of the present invention, the size of the test sample is 50 mm+1 mm, and the length of the first gasket and the length of the third gasket in the X direction are both 50 mm.

A stress blank angle eliminating method for a dynamic true triaxial electromagnetic Hopkinson bar, wherein the method applies any one of the devices mentioned above to perform the following operations:

placing the first gasket at the bottom portion stably, and making the first gasket be tightly embedded with the second gasket by embedding the protection structure on the right side of the first gasket in the groove on the bottom side of the second gasket on the right side;

embedding the projection structure of the third gasket on the rear side in the antifriction guide rail on the rear side of the first gasket at the bottom portion to enable the third gasket slide in a Z direction relative to the first gasket, so that the first gasket is connected with the third gasket;

placing the test sample at joints of the first gasket, the second gasket and the third gasket and adjusting the gaskets to be contacted with the test sample until there is no gap;

placing the fourth gasket on the front side, embedding the projection structure at the bottom side of the fourth gasket in the antifriction guide rail on the front side of the first gasket at the bottom portion to enable the fourth gasket slide in the Y direction relative to the first gasket, and adjusting displacement of the fourth gasket in the Y direction until there is no gap between the fourth gasket and a contact surface of the sample in the Y direction;

placing the guide rail sealing cover of the first gasket, wherein during placing, the central axis of the spring of the guide rail sealing cover is along the Y direction, the guide rail sealing cover of the first gasket is compressed and deformed when the projection structure of the fourth gasket is contacted with the guide rail sealing cover of the first gasket by using compressibility of the spring in the guide rail sealing cover, the guide rail sealing cover of the first gasket is installed at the bottom portion of the first gasket and there is no relative displacement between the guide rail sealing cover and the antifriction guide rail to achieve an objective of limiting the displacement of the fourth gasket relative to the first gasket in the Y direction and ensure that the stress blank angle eliminating device does not move in the Y direction;

placing the fifth gasket at the top portion, embedding the front-side projection structure and the right-side projection structure of the fifth gasket in the antifriction guide rail on a top portion of the fourth gasket on the front side and the top-side antifriction guide rail of the second gasket on the right side respectively to enable the fifth gasket slide in the Z direction relative to the fourth gasket and the second gasket and be tightly contacted with a top portion of the third gasket on the rear side, and adjusting displacement of the fifth gasket in the Z direction, wherein the third gasket also moves in the Z direction with the fifth gasket in the antifriction guide rail on the rear side of the first gasket at the moment until there is no gap between the fifth gasket and the contact surface of the sample in the Z direction;

placing the guide rail sealing covers of the fourth gasket and the second gasket, wherein the central axes of the springs of the two guide rail sealing covers limit the displacement of the fifth gasket in the Z direction along the Z direction to fix the fifth gasket and ensure that the stress blank angle eliminating device does not move in the Z direction; and compressing the thin filling block of the sixth gasket; and then compressing the long filling block of the sixth gasket.

As a further improvement of the present invention, in the X direction, the adjusted stress blank angle eliminating device and the test sample are placed between an X+ direction waveguide bar and an X− direction waveguide bar, and a triaxial six-direction synchronous impact test is carried out after the stress blank angle eliminating device and the waveguide bars are closely attached with no gap.

As a further improvement of the present invention, the six gaskets are made of the same material as the waveguide bars.

As a further improvement of the present invention, the bottom side of the second gasket is provided with a clamping bolt, and the clamping bolt on the bottom side of the second gasket is screwed tightly, so that the first gasket is tightly embedded with the second gasket.

As a further improvement of the present invention, a rear side of the fifth gasket is provided with a clamping bolt, and the clamping bolt on the rear side of the fifth gasket is screwed tightly to ensure that the stress blank angle eliminating device does not move in the Z direction.

As a further improvement of the present invention, the sixth gasket on the left side comprises an upper-side clamping bolt and a left-side clamping bolt, and the upper-side clamping bolt of the sixth gasket is screwed tightly to compress the thin filling block; and the left-side clamping bolt of the sixth gasket is screwed tightly to compress the long filling block.

The present invention has the beneficial effects that:

According to the dynamic true triaxial electromagnetic Hopkinson bar system, an interlocking micro-adjustment test device for eliminating the stress blank angle is designed, which can adjust the distance between the test sample and each gasket according to the size of the test sample, so as to eliminate the influence of the stress blank angle in the test sample and prevent the Hopkinson bars from colliding with each other to produce the permanent deformation. The adjustable test device for eliminating the stress blank angle can eliminate the influence of the stress blank angle generated by the sample during the triaxial six-direction dynamic impact test, which is convenient for obtaining real dynamic failure parameters of the sample.

The guide rail sealing cover is compressed and deformed when the projection structure of the gasket is contacted with the guide rail sealing cover by using the compressibility of the spring in the guide rail sealing cover, the guide rail sealing cover is installed at the bottom portion of the gasket until the guide rail sealing cover cannot remove to achieve an objective of limiting the displacement of the gasket in a certain direction and ensure that the stress blank angle eliminating device does not move in this direction.

Figure 1A:
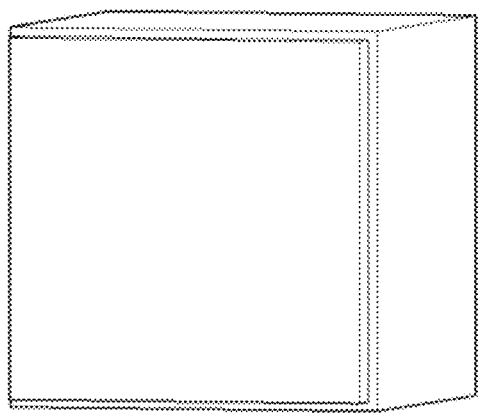
FIG. 1A is a schematic diagram of gasket loading and stress blank angle generation in the prior art.
Figure 1B:
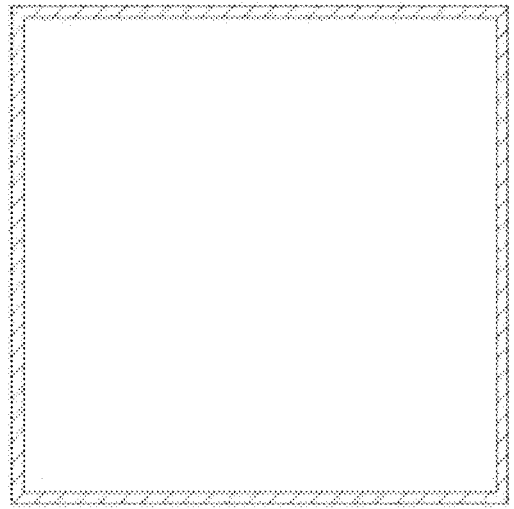
FIG. 1B is a schematic diagram of the stress blank angle in the prior art.

Names of corresponding components in the drawing are as follows: 1 refers to X axial auxiliary slide rail, 2 refers to outer protective frame of X+ direction electromagnetic pulse gun, 3 refers to X+ direction electromagnetic pulse gun supporting base, 4 refers to X+ direction electromagnetic pulse gun, 5 refers to X axial supporting platform, 6 refers to X+ direction bar boss, 7 refers to X+ waveguide bar supporting holder, 8 refers to X+ direction waveguide bar, 9 refers to stress blank angle eliminating device, 10 refers to X− direction waveguide bar, 11 refers to X− waveguide bar supporting holder, 12 refers to X− direction bar boss, 13 refers to X− direction electromagnetic pulse gun, 14 refers to X− direction electromagnetic pulse gun supporting base, 15 refers to outer protective frame of X− direction electromagnetic pulse gun, 16 refers to X axial hydraulic top plate, and 100 refers to guide rail sealing cover of first gasket.

DESCRIPTION OF EMBODIMENTS

The present invention is further explained with reference to the drawings hereinafter.

Figure 2:
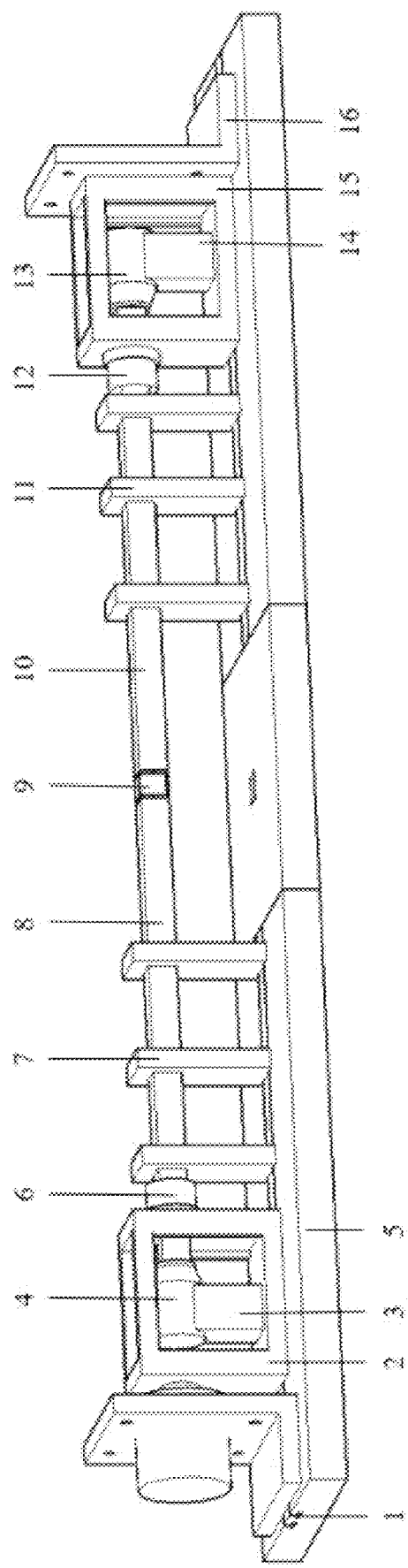
FIG. 2 is a three-dimensional diagram of a dynamic true triaxial electromagnetic Hopkinson bar system additionally provided with a micro-adjustment device for eliminating a stress blank angle (taking an X+ direction as an example)

Embodiment 1: FIG. 2 is a three-dimensional diagram of a dynamic true triaxial electromagnetic Hopkinson bar system additionally provided with a micro-adjustment device for eliminating a stress blank angle (taking an X direction as an example). In the figure, component 9 is the stress blank angle eliminating device, and other components in the figure refer to a system in the dynamic true triaxial electromagnetic Hopkinson bar system of the prior art. Only the figure in the X direction is drawn in the figure, and in practical application, triaxial six-direction (X, Y and Z) loading is carried out.

Figure 9:
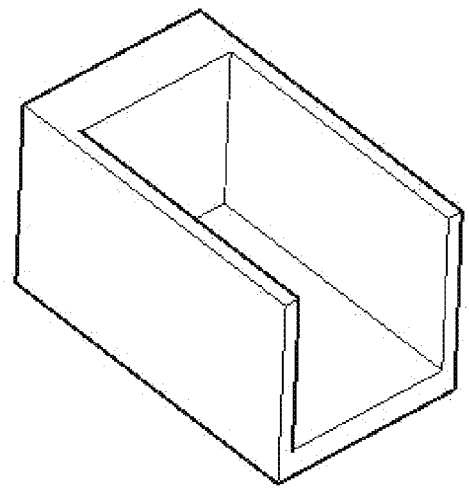
FIG. 9 is a schematic diagram of an antifriction guide rail according to the present invention.
Figure 10A:
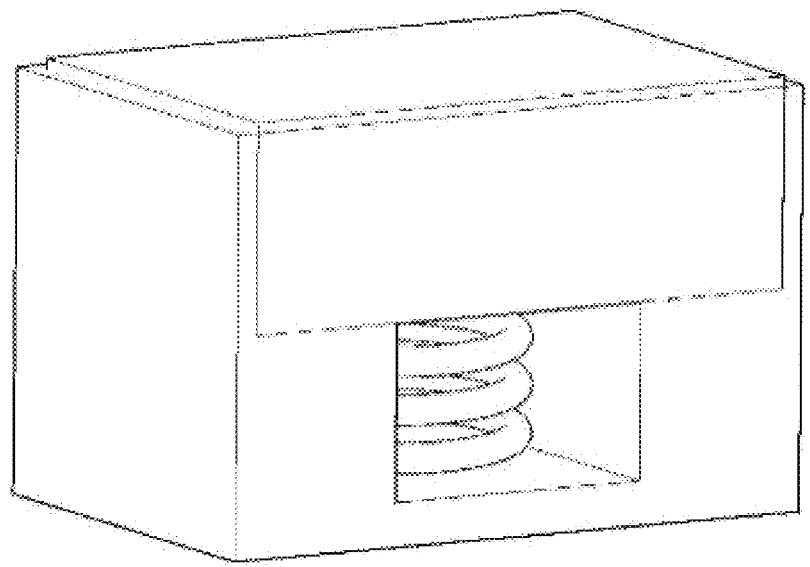
FIG. 10A is a three-dimensional diagram of an internal structure of a guide rail sealing cover before compression according to the present invention.
Figure 10B:
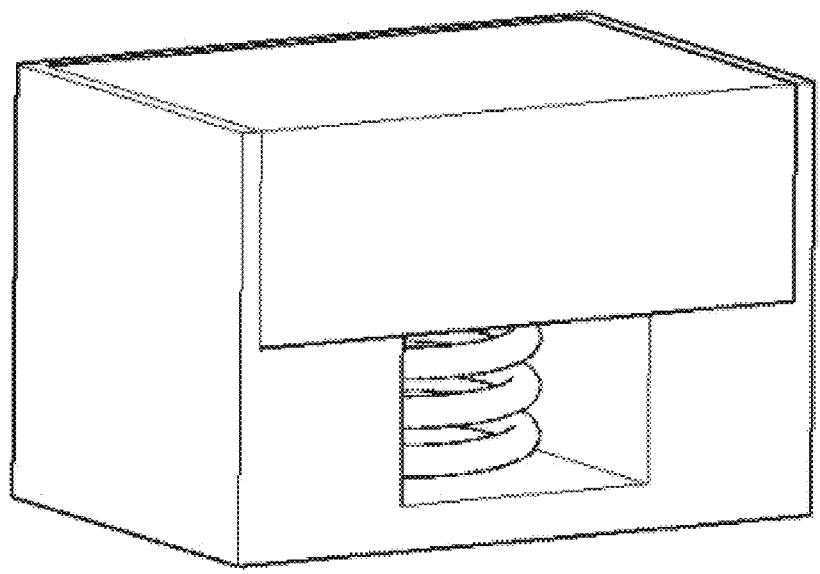
FIG. 10B is a three-dimensional diagram of the internal structure of the guide rail sealing cover after compression according to the present invention.

As an interlocking micro-adjustment test device (i.e. the stress blank angle eliminating device 9) specially applied to the dynamic true triaxial electromagnetic Hopkinson bar system, the device mainly consists of six gaskets made of the same material as waveguide bars, antifriction guide rails (see FIG. 9), a guide rail sealing cover and a plurality of clamping bolts. The antifriction guide rail has the characteristic of low friction. The guide rail sealing cover is shown in FIG. 10A and FIG. 10B, wherein a spring is arranged at a bottom portion of the guide rail sealing cover.

Figure 11A:
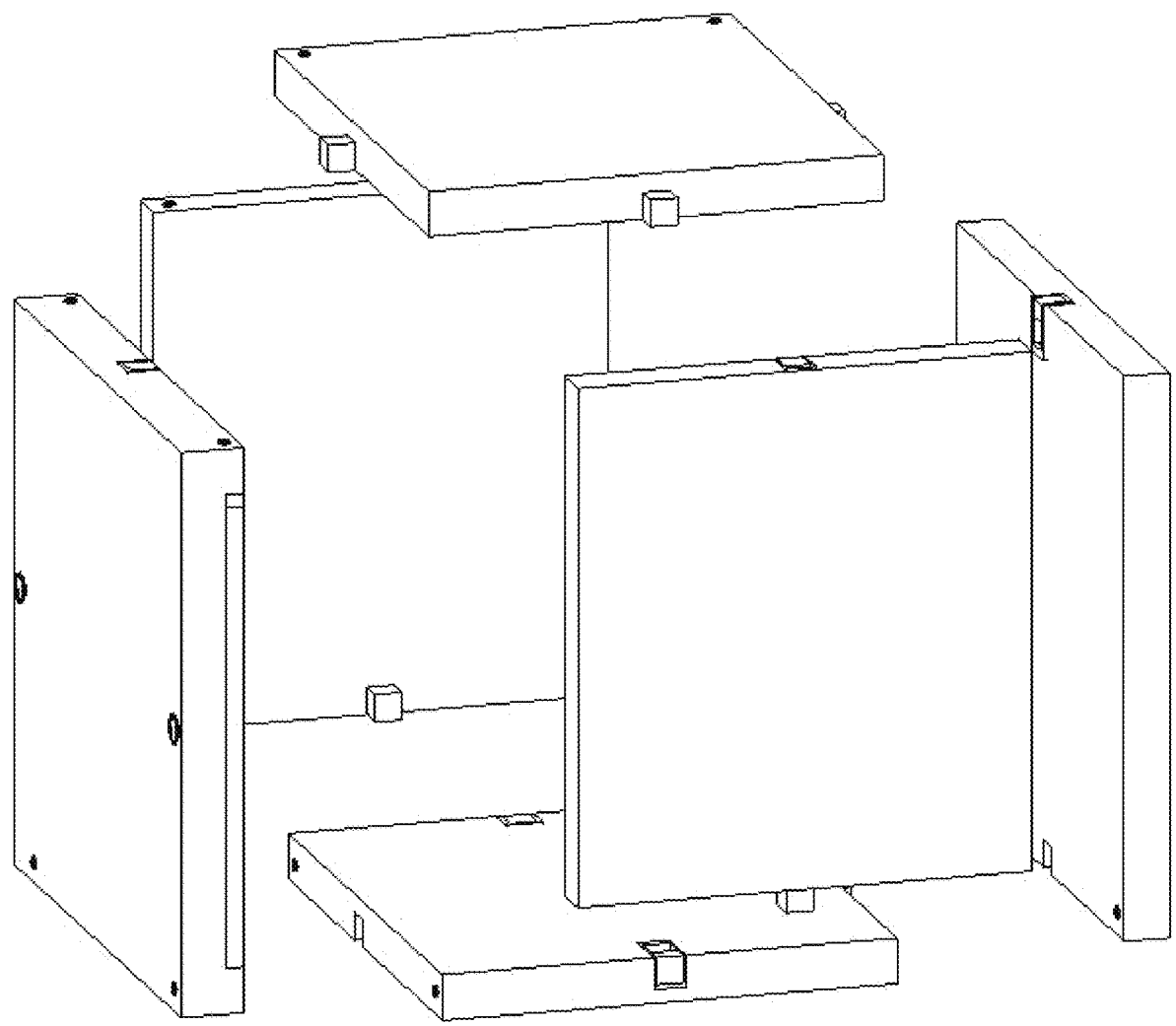
FIG. 11A is an exploded view of a stress blank angle eliminating device according to the present invention.
Figure 11B:
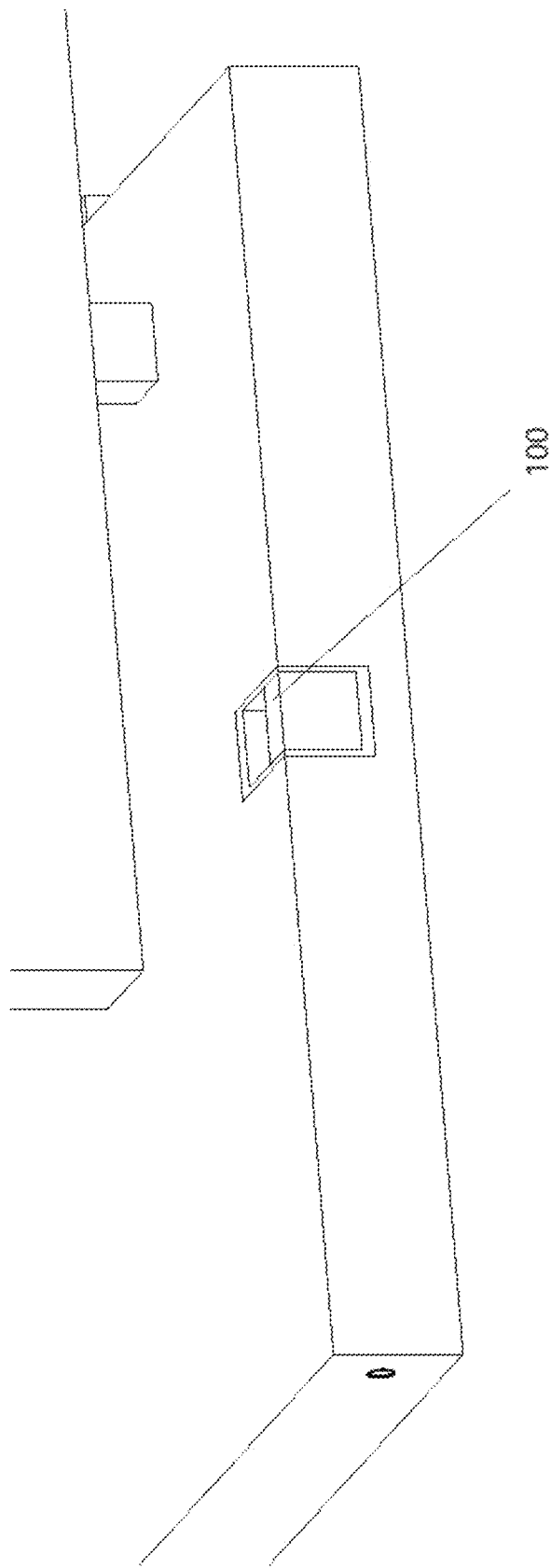
FIG. 11B is an enlarged view of a bottom portion of FIG. 11A.
Figure 11C:
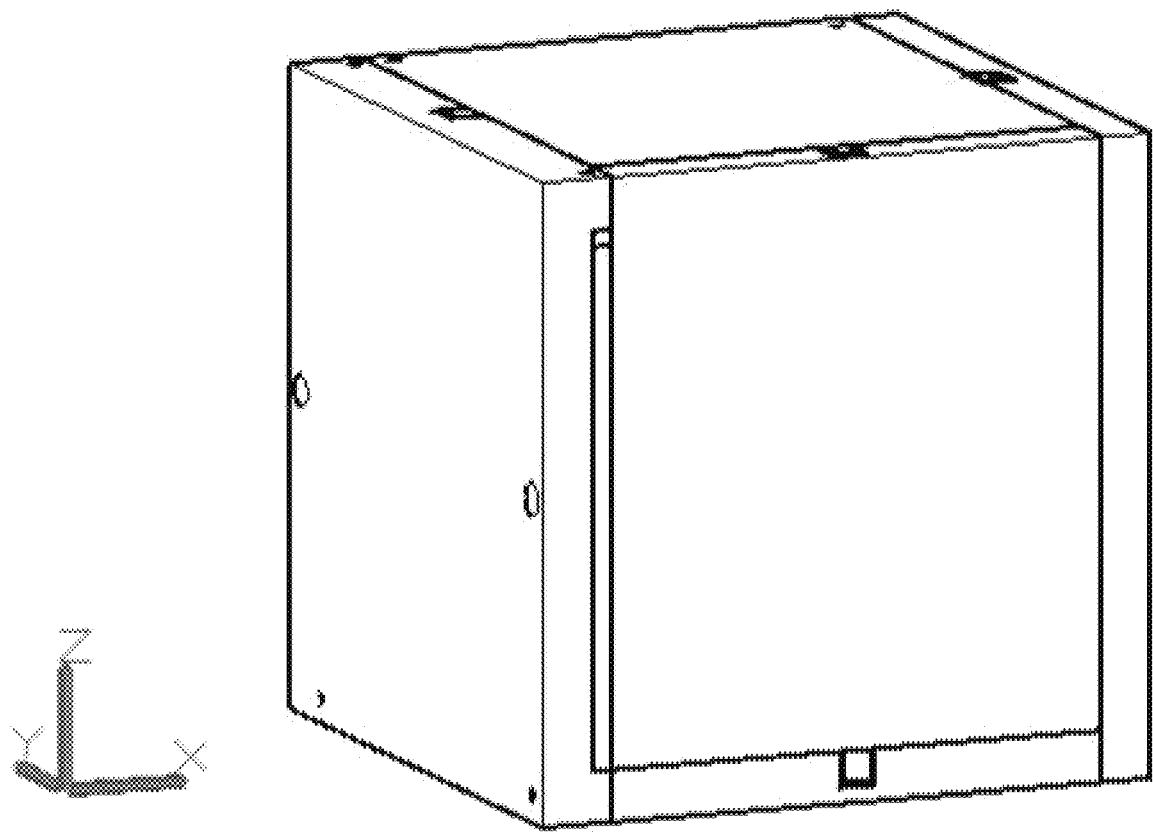
FIG. 11C is a three-dimensional diagram of assembly of the stress blank angle eliminating device according to the present invention.
Figure 11D:
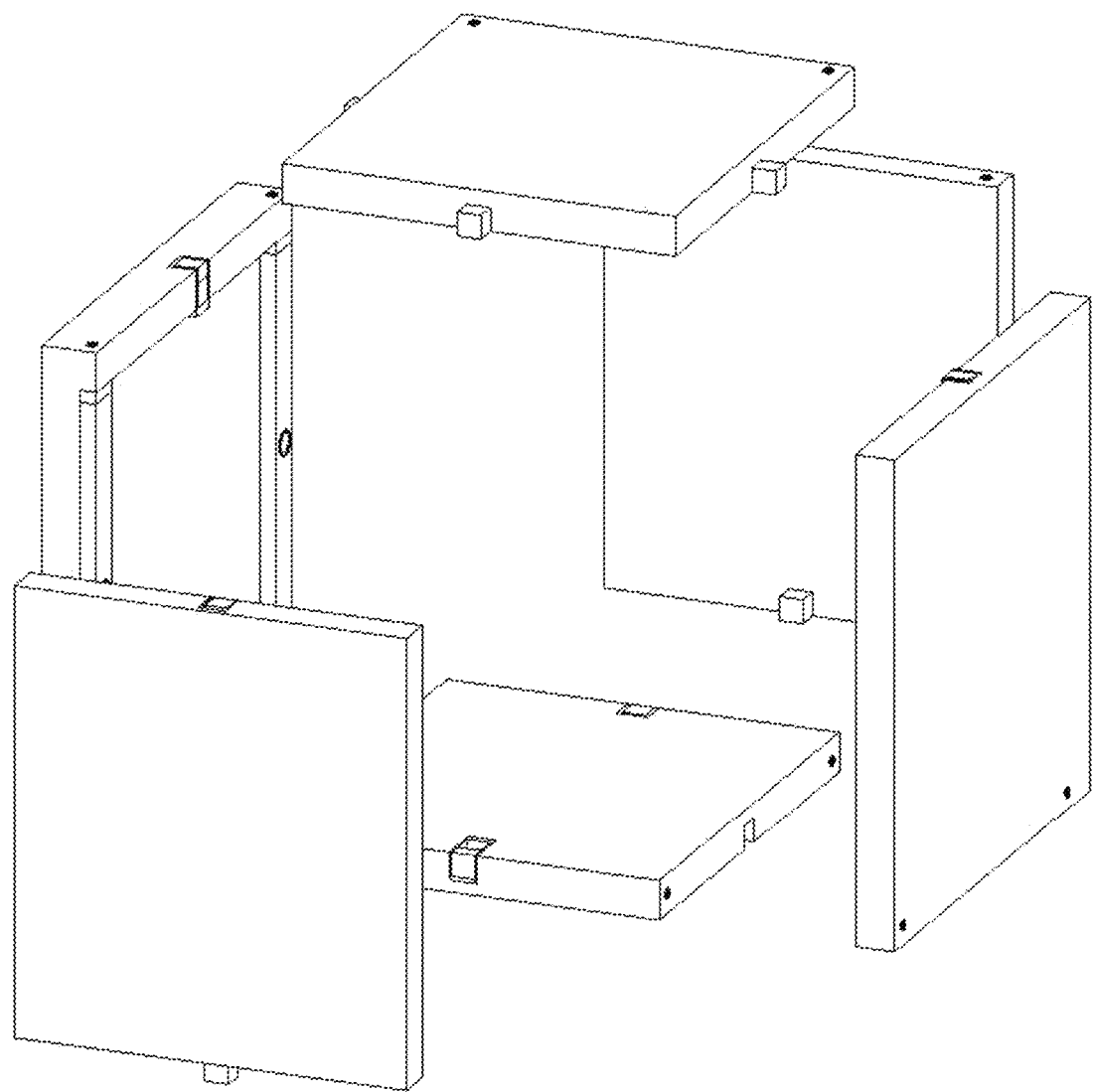
FIG. 11D is an exploded view of a stress blank angle eliminating device according to the present invention from another angle.

As shown in FIG. 11A, FIG. 11C and FIG. 11D, a stress blank angle eliminating device for a dynamic true triaxial electromagnetic Hopkinson bar comprises six gaskets, which are respectively a first gasket, a second gasket, a third gasket, a fourth gasket, a fifth gasket and a sixth gasket; and further comprises a guide rail sealing cover, wherein a spring is arranged in the guide rail sealing cover.

Figure 3:
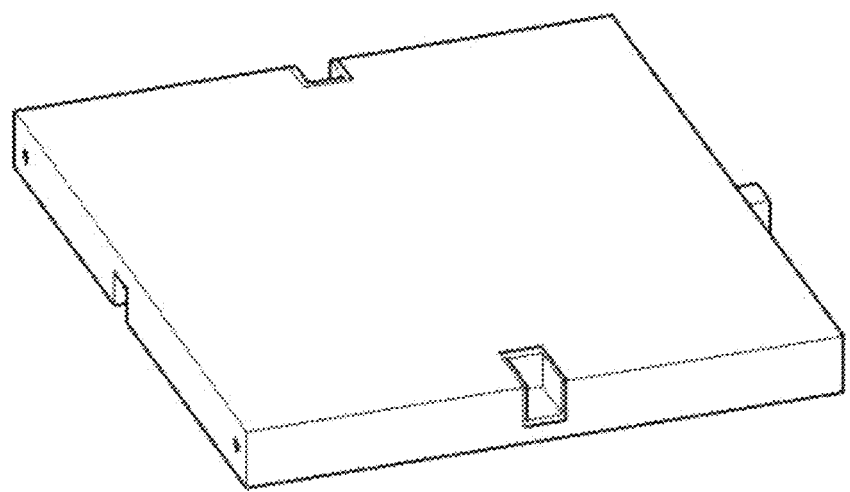
FIG. 3 is a schematic diagram of a first gasket at a bottom portion according to the present invention.
Figure 4:
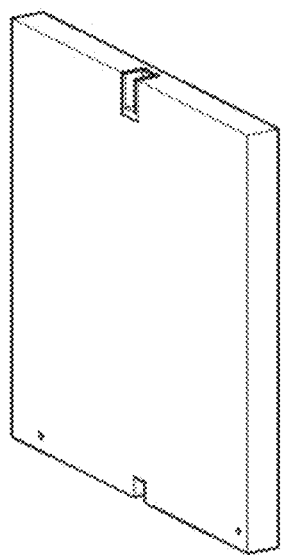
FIG. 4 is a schematic diagram of a second gasket on a right side according to the present invention.

As shown in FIG. 3, a right side of the first gasket at a bottom portion is provided with a projection structure, as shown in FIG. 4, a bottom side of the second gasket on a right side is provided with a groove, the projection structure on the right side of the first gasket at the bottom portion is matched with the groove on the bottom side of the second gasket on the right side, the bottom side of the second gasket is provided with a clamping bolt, and the clamping bolt enables the first gasket to be tightly embedded with the second gasket.

Figure 5:
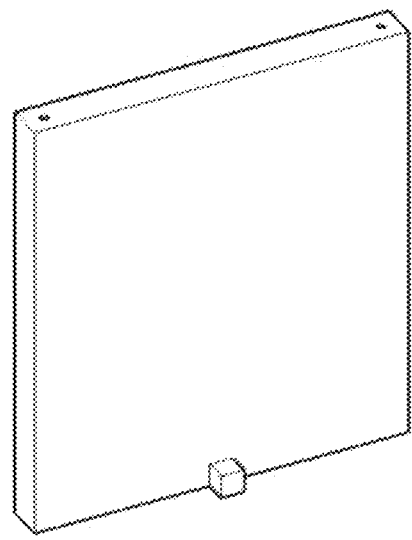
FIG. 5 is a schematic diagram of a third gasket on a rear side according to the present invention.

As shown in FIG. 5, the third gasket on a rear side is provided with a projection structure, a rear side of the first gasket at the bottom portion is provided with an antifriction guide rail, and the antifriction guide rail has the characteristic of low friction, which ensures that the projection structure can slide in the antifriction guide rail; the projection structure of the third gasket is embedded on the rear side in the antifriction guide rail on the rear side of the first gasket at the bottom portion to enable the third gasket slide in a Z direction (see FIG. 11C) relative to the first gasket, so that the first gasket is connected with the third gasket.

Figure 6:
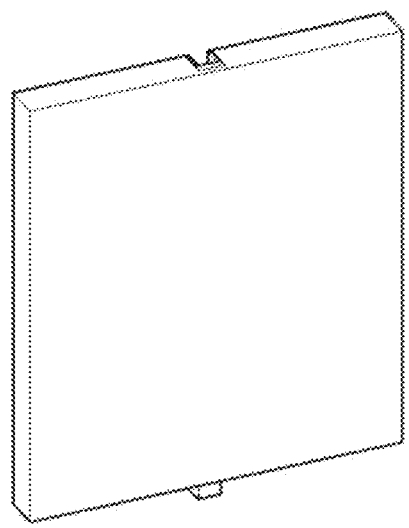
FIG. 6 is a schematic diagram of a fourth gasket on a front side according to the present invention.

As shown in FIG. 6, a bottom side of the fourth gasket on a front side is provided with a projection structure, a front side of the first gasket at the bottom portion is provided with an antifriction guide rail, and the projection structure on the bottom side of the fourth gasket on the front side is embedded in the antifriction guide rail on the front side of the first gasket at the bottom portion; in this case, the fourth gasket can slide freely relative to the first gasket in a Y direction. The guide rail sealing cover matched with the antifriction guide rail on the front side of the first gasket is further comprised, wherein a central axis of the spring of the guide rail sealing cover is arranged along the Y direction.

Figure 7:
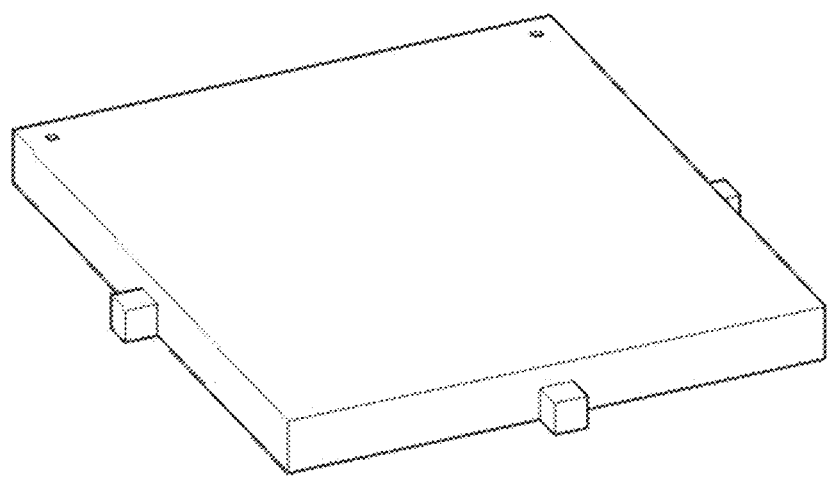
FIG. 7 is a schematic diagram of a fifth gasket at a top portion according to the present invention.

As shown in FIG. 7, the fifth gasket at a top portion is provided with a front-side projection structure and a right side projection structure, the fourth gasket on the front side is provided with a top-side antifriction guide rail, and the second gasket on the right side is provided with a top-side antifriction guide rail. The fourth gasket on the front side is further provided with a guide rail sealing cover matched with the top-side antifriction guide rail of the fourth gasket, and the second gasket on the right side is further provided with a guide rail sealing cover matched with the top-side antifriction guide rail of the second gasket. The fifth gasket at the top portion can slide freely in the Z direction, and is tightly contacted with a top portion of the third gasket on the rear side. A rear side of the fifth gasket is provided with a clamping bolt.

A length of the first gasket and a length of the third gasket in an X direction are both smaller than a length of a test sample in the X direction to ensure that a left side of the sample in the X direction will expose part of the length in this case.

Figure 8A:
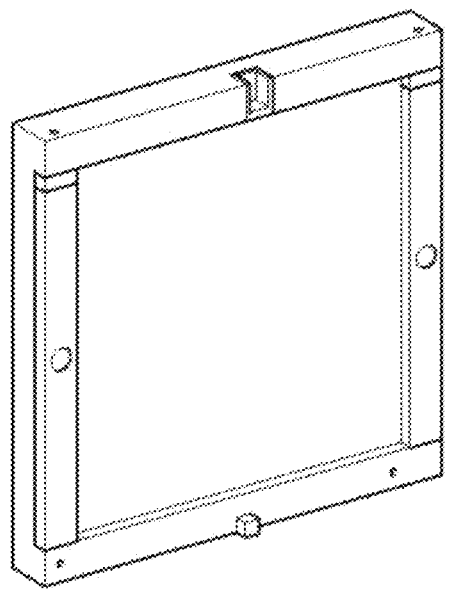
FIG. 8A is a schematic diagram of a sixth gasket on a left side according to the present invention.
Figure 8B:
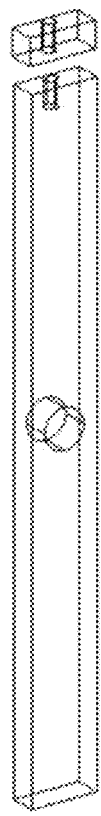
FIG. 8B is a schematic diagram of a thin filling block and a long filling block.
Figure 12:
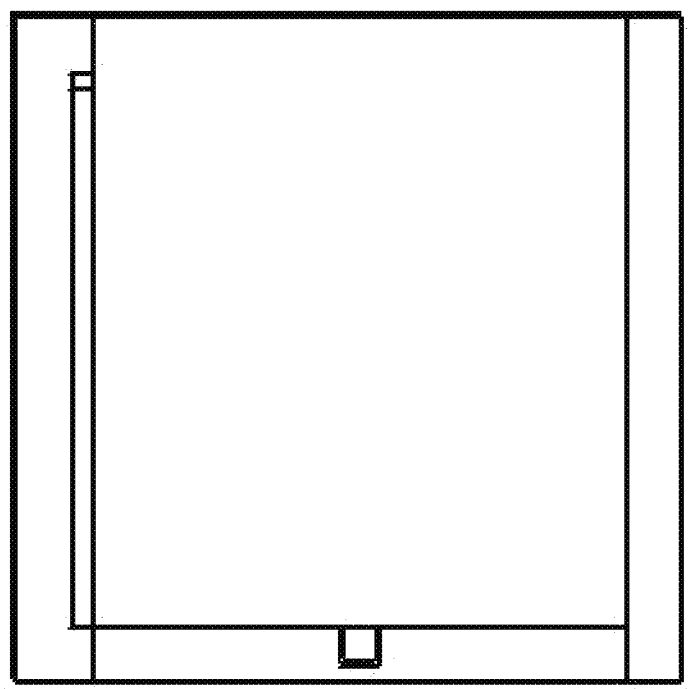
FIG. 12 is a front assembly view of a micro-adjustment device for eliminating a stress blank angle according to the present invention.
Figure 13:
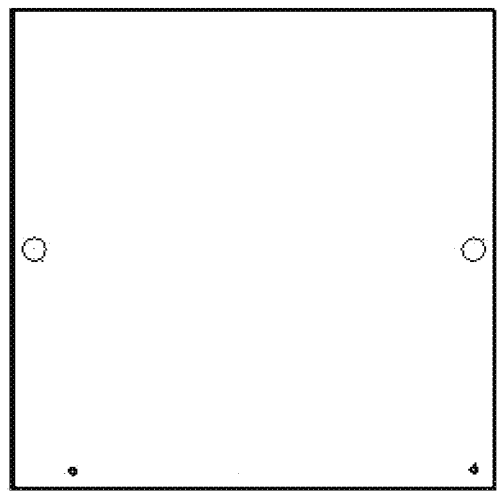
FIG. 13 is a side assembly view of the micro-adjustment device for eliminating a stress blank angle according to the present invention.
Figure 14:
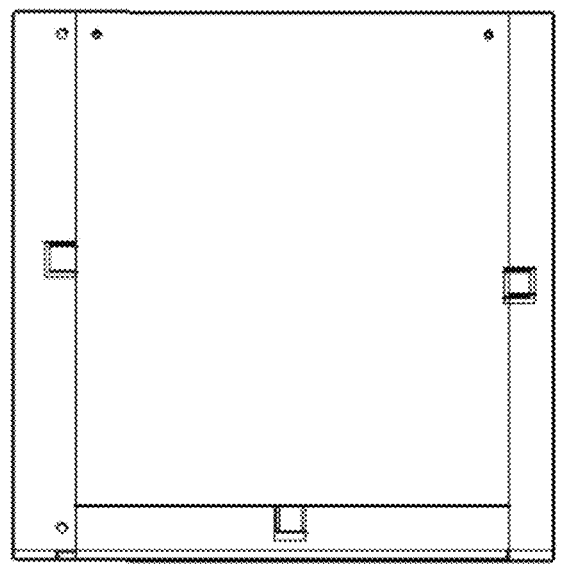
FIG. 14 is a plan assembly view of the micro-adjustment device for eliminating the stress blank angle according to the present invention.

FIG. 8A shows the sixth gasket on the left side. Left and right sides of the sixth gasket are respectively provided with a thin filling block and a long filling block which are capable of being compressed and deformed (as shown in FIG. 8B), and the two clamping bolts on the upper side of the sixth gasket are screwed tightly to compress the thin filling block until there is no gap between the sixth gasket and a left side top surface of the sample in the Z direction. The two clamping bolts on the left side of the sixth gasket are screwed tightly to compress the long filling block until there is no gap between the sixth gasket and a left side surface of the sample in the X direction. See FIG. 12, FIG. 13 and FIG. 14 for details.

Embodiment 2: a stress blank angle eliminating method for a dynamic true triaxial electromagnetic Hopkinson bar:

As shown in FIG. 11A and FIG. 11C, a size of the test sample is about 50 mm (+1 mm), the first gasket at the bottom portion (see FIG. 3) is placed and fixed (placed stably), and the first gasket is tightly embedded with the second gasket by embedding the protection structure on the right side of the first gasket in the groove on the bottom side of the second gasket on the right side (see FIG. 4) (the bottom side refers to a position where a side surface is close to the bottom portion, the same below). At the same time, the two (not limited to two, but one or more) clamping bolts on the bottom side of the second gasket are screwed tightly. The projection structure of the third gasket on the rear side (see FIG. 5) is embedded in the antifriction guide rail on the rear side of the first gasket at the bottom portion (slidable in a Z direction, wherein see FIG. 11C for the direction), so that the first gasket is connected with the third gasket. the test sample is placed at joints of the first gasket, the second gasket and the third gasket, and the gaskets are adjusted to be contacted with the test sample until there is no gap. The bottom-side projection structure of the fourth gasket on the front side (see FIG. 6) is embedded in the antifriction guide rail on the front side of the first gasket at the bottom portion (slidable in a Y direction). In this case, the fourth gasket can slide freely in a Y direction. Displacement of the fourth gasket in the Y direction is adjusted until there is no gap between the fourth gasket and a contact surface of the sample in the Y direction.

The guide rail sealing cover of the first gasket (see FIG. 10A, FIG. 10B and FIG. 11B) is placed, the guide rail sealing cover of the first gasket is compressed and deformed when the projection structure of the fourth gasket is contacted with the guide rail sealing cover of the first gasket by using compressibility of the spring in the guide rail sealing cover, the guide rail sealing cover is installed at the bottom portion of the first gasket until the guide rail sealing cover cannot move to achieve an objective of limiting the displacement of the fourth gasket relative to the first gasket in the Y direction and ensure that the stress blank angle eliminating device does not move in the Y direction. A size difference between the guide rail sealing cover and the antifriction guide rail is 0.05 mm, and there is no relative displacement between the guide rail sealing cover and the antifriction guide rail.

The fifth gasket at the top portion (see FIG. 7) is placed, the front-side projection structure and the right-side projection structure of the fifth gasket are embedded in the antifriction guide rail on a top portion of the fourth gasket on the front side (slidable in the Z direction) and the top-side antifriction guide rail of the second gasket on the right side (slidable in the Z direction) respectively, and are tightly contacted with a top portion of the third gasket on the rear side. In this case, the fifth gasket can slide freely in the Z direction. Displacement of the fifth gasket in the Z direction is adjusted, wherein the third gasket also moves with the fifth gasket in the antifriction guide rail on the rear side of the first gasket at the moment (Z direction) until there is no gap between the fifth gasket and the contact surface of the sample in the Z direction. The guide rail sealing covers of the fourth gasket and the second gasket are placed, the displacement of the fifth gasket in the Z direction is limited, and the two clamping bolts (preferably two, but not limited to two) of the rear side of the fifth gasket are screwed tightly to ensure that the stress blank angle eliminating device does not move in the Z direction. The length of the first gasket and the length of the third gasket in the X direction are both 50 mm (for example, not limited to this value, and selected according to the test needs), which is less than the length of the test sample in the X direction, so as to ensure that the left side of the sample in the X direction will expose part of the length in this case. The sixth gasket on the left side (see FIG. 8A) is placed. Left and right sides of the sixth gasket are respectively placed with a thin filling block and a long filling block which are capable of being compressed and deformed (as shown in FIG. 8B), and the two (preferably two) clamping bolts on the upper side of the sixth gasket are screwed tightly to compress the thin filling block until there is no gap between the sixth gasket and a left side top surface of the sample in the Z direction. The two (preferably two) clamping bolts on the left side of the sixth gasket are screwed tightly to compress the long filling block until there is no gap between the sixth gasket and a left side surface of the sample in the X direction. So far, the test sample is closely connected with the stress blank angle eliminating device, and no stress blank angle is generated in the sample during the triaxial six-direction impact test.

Taking an X+ direction impact test as an example, vaseline is evenly coated on a surface of an interlocking micro-adjustment mold, and the adjusted stress blank angle eliminating device and the test sample are placed between an X+ direction waveguide bar 8 and an X− direction waveguide bar 10. A triaxial six-direction synchronous impact test can be carried out when the stress blank angle eliminating device and the waveguide bars are tightly attached with no gap.

The foregoing are further detailed descriptions of the present invention with reference to the specific preferred embodiments, and it should not be considered that the embodiments of the present invention are limited to these descriptions. For those having ordinary skills in the art, some simple deduction or replacement can be made without departing from the concept of the present invention, which shall all be included within the scope of protection of the present invention.

What is claimed is:

1. A stress blank angle eliminating device for a dynamic true triaxial electromagnetic Hopkinson bar, wherein:
   the device comprises six gasket, which are respectively a first gasket, a second gasket, a third gasket, a fourth gasket, a fifth gasket and a sixth gasket; and further comprises a guide rail sealing cover, wherein a spring is arranged in the guide rail sealing cover;
   a right side of the first gasket at a bottom portion is provided with a projection structure, a bottom side of the second gasket on a right side is provided with a groove, the projection structure on the right side of the first gasket at the bottom portion is matched with the groove on the bottom side of the second gasket on the right side, and the first gasket is tightly embedded with the second gasket;
   the third gasket on a rear side is provided with a projection structure, a rear side of the first gasket at the bottom portion is provided with an antifriction guide rail, and the projection structure slides in the antifriction guide rail;
   a bottom side of the fourth gasket on a front side is provided with a projection structure, a front side of the first gasket at the bottom portion is provided with an antifriction guide rail, and the projection structure on the bottom side of the fourth gasket on the front side is embedded in the antifriction guide rail on the front side of the first gasket at the bottom portion; and the guide rail sealing cover matched with the antifriction guide rail on the front side of the first gasket is further comprised, wherein a central axis of the spring of the guide rail sealing cover is arranged along a Y direction;

the fifth gasket at a top portion is provided with a front-side projection structure and a right side projection structure, the fourth gasket on the front side is provided with a top-side antifriction guide rail, and the second gasket on the right side is provided with a top-side antifriction guide rail; and the fourth gasket on the front side is further provided with a guide rail sealing cover matched with the top-side antifriction guide rail of the fourth gasket, and the second gasket on the right side is further provided with a guide rail sealing cover matched with the top-side antifriction guide rail of the second gasket;

a length of the first gasket and a length of the third gasket in an X direction are both smaller than a length of a test sample in the X direction; and left and right sides of the sixth gasket are respectively provided with a thin filling block and a long filling block which are capable of being compressed and deformed; a size difference between the guide rail sealing cover and the antifriction guide rail is 0.05 mm; and a size of the test sample is L mm+1 mm, the length of the first gasket and the length of the third gasket in the X direction are both L mm, and L is a value set according to test needs.

2. The stress blank angle eliminating device for the dynamic true triaxial electromagnetic Hopkinson bar according to claim 1, wherein the size of the test sample is 50 mm+1 mm, and the length of the first gasket and the length of the third gasket in the X direction are both 50 mm.

3. A stress blank angle eliminating method for a dynamic true triaxial electromagnetic Hopkinson bar, wherein the method applies the device according to claim 1 to perform the following operations:

placing the first gasket at the bottom portion stably, and making the first gasket be tightly embedded with the second gasket by embedding the protection structure on the right side of the first gasket in the groove on the bottom side of the second gasket on the right side;

embedding the projection structure of the third gasket on the rear side in the antifriction guide rail on the rear side of the first gasket at the bottom portion to enable the third gasket slide in a Z direction relative to the first gasket, so that the first gasket is connected with the third gasket;

placing the test sample at joints of the first gasket, the second gasket and the third gasket and adjusting the gaskets to be contacted with the test sample until there is no gap;

placing the fourth gasket on the front side, embedding the projection structure at the bottom side of the fourth gasket in the antifriction guide rail on the front side of the first gasket at the bottom portion to enable the fourth gasket slide in the Y direction relative to the first gasket, and adjusting displacement of the fourth gasket in the Y direction until there is no gap between the fourth gasket and a contact surface of the sample in the Y direction;

placing the guide rail sealing cover of the first gasket, wherein during placing, the central axis of the spring of the guide rail sealing cover is along the Y direction, the guide rail sealing cover of the first gasket is compressed and deformed when the projection structure of the fourth gasket is contacted with the guide rail sealing cover of the first gasket by using compressibility of the spring in the guide rail sealing cover, the guide rail sealing cover of the first gasket is installed at the bottom portion of the first gasket and there is no relative displacement between the guide rail sealing cover and the antifriction guide rail to achieve an objective of limiting the displacement of the fourth gasket relative to the first gasket in the Y direction and ensure that the stress blank angle eliminating device does not move in the Y direction;

placing the fifth gasket at the top portion, embedding the front-side projection structure and the right-side projection structure of the fifth gasket in the antifriction guide rail on a top portion of the fourth gasket on the front side and the top-side antifriction guide rail of the second gasket on the right side respectively to enable the fifth gasket slide in the Z direction relative to the fourth gasket and the second gasket and be tightly contacted with a top portion of the third gasket on the rear side, and adjusting displacement of the fifth gasket in the Z direction, wherein the third gasket also moves in the Z direction with the fifth gasket in the antifriction guide rail on the rear side of the first gasket at the moment until there is no gap between the fifth gasket and the contact surface of the sample in the Z direction;

placing the guide rail sealing covers of the fourth gasket and the second gasket, wherein the central axes of the springs of the two guide rail sealing covers limit the displacement of the fifth gasket in the Z direction along the Z direction to fix the fifth gasket and ensure that the stress blank angle eliminating device does not move in the Z direction; and compressing the thin filling block of the sixth gasket; and then compressing the long filling block of the sixth gasket.

4. The stress blank angle eliminating method for the dynamic true triaxial electromagnetic Hopkinson bar according to claim 3, wherein in the X direction, the adjusted stress blank angle eliminating device and the test sample are placed between an X+ direction waveguide bar and an X− direction waveguide bar, and a triaxial six-direction synchronous impact test is carried out after the stress blank angle eliminating device and the waveguide bars are closely attached with no gap.

5. The stress blank angle eliminating method for the dynamic true triaxial electromagnetic Hopkinson bar according to claim 4, wherein the six gaskets are made of the same material as the waveguide bars.

6. The stress blank angle eliminating method for the dynamic true triaxial electromagnetic Hopkinson bar according to claim 3, wherein the bottom side of the second gasket is provided with a clamping bolt, and the clamping bolt on the bottom side of the second gasket is screwed tightly, so that the first gasket is tightly embedded with the second gasket.

7. The stress blank angle eliminating method for the dynamic true triaxial electromagnetic Hopkinson bar according to claim 3, wherein a rear side of the fifth gasket is provided with a clamping bolt, and the clamping bolt on the rear side of the fifth gasket is screwed tightly to ensure that the stress blank angle eliminating device does not move in the Z direction.

8. The stress blank angle eliminating method for the dynamic true triaxial electromagnetic Hopkinson bar according to claim 3, wherein the sixth gasket on the left side comprises an upper-side clamping bolt and a left-side clamping bolt, and the upper-side clamping bolt of the sixth gasket is screwed tightly to compress the thin filling block; and the left-side clamping bolt of the sixth gasket is screwed tightly to compress the long filling block.

* * * * *